United States Patent
Khouri et al.

(10) Patent No.: US 6,678,718 B1
(45) Date of Patent: Jan. 13, 2004

(54) METHOD AND APPARATUS FOR ESTABLISHING CONNECTIONS

(75) Inventors: Joseph F. Khouri, San Jose, CA (US); Michael L. Mack, Los Gatos, CA (US); Gautam Sinha, Fremont, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 08/920,669

(22) Filed: Aug. 29, 1997

(51) Int. Cl.[7] .............................................. G06F 15/16
(52) U.S. Cl. ...................... 709/204; 709/204; 709/205; 709/206; 379/90.01; 379/93.14; 379/93.17; 379/265.09; 379/265.01; 379/265.11; 379/93.23; 370/352; 370/401
(58) Field of Search ................................ 709/203, 204, 709/205, 206; 370/271, 352, 401; 379/90.01, 93.14, 93.02, 93.17, 265.01, 265.02, 265.09, 265.11, 93.23

(56) References Cited

U.S. PATENT DOCUMENTS

| | | | |
|---|---|---|---|
| 4,964,077 A | | 10/1990 | Eisen et al. |
| 5,001,710 A | * | 3/1991 | Gawrys et al. .............. 370/271 |
| 5,239,617 A | | 8/1993 | Gardner et al. |

(List continued on next page.)

OTHER PUBLICATIONS

Dialogic Corp. –13 Production introduction—, Dialogic Dialog/HD DualSpan (Voice I/O device)—Product introduction, EDGE, on & about AT&T, V11, n11, p9(1), Mar.1996.*

General Functions of the Telephone Message and Signals, ITU–T Recommendations Q.722, Fascicle VI.8 of the Blue Book, pp. 14, no date given.

Illuminet Signaling System 7(SS7), The International Engineering Consortium, pp. 29, No date given.

SS7 Tutorial, Performance Technologies, Inc.,pp. 23, No date given.

Integrated Services Digital Network (ISDN)–User to User Signaling Supplementary Service, Sep. 1, 1992, 38 pages, T1.621–1992, American National Standards Institute, Inc., USA.

*Primary Examiner*—Wellington Chen
*Assistant Examiner*—Chuong Ho
(74) *Attorney, Agent, or Firm*—Blakely, Sokoloff, Taylor & Zafman LLP

(57) ABSTRACT

A system is provided for establishing a connection between a telephone agent and a computer user. A request is received from the user requesting a return call by an agent. The request is received through a web server and includes an identifier associated with the web page being viewed by the user. The identifier associated with the web page is transmitted to an agent that will contact the user. This allows the agent to view the web page that was being viewed by the user when the request was entered. A telephone connection is then established between the user and the agent. An agent can be selected based on the content of the web page being viewed by the user at the time the request for agent contact is entered. Additionally, for an incoming call, a web page can be generated that contains information about the incoming call. An identifier associated with the generated web page is transmitted to an agent that will answer the call. The agent then accesses the web page using the received identifier.

19 Claims, 5 Drawing Sheets

U.S. PATENT DOCUMENTS

| | | | |
|---|---|---|---|
| 5,619,648 A | * | 4/1997 | Canale et al. ............... 709/206 |
| 5,703,880 A | | 12/1997 | Miura |
| 5,727,129 A | | 3/1998 | Barrett et al. |
| 5,765,033 A | * | 6/1998 | Miloslavsky ................ 709/206 |
| 5,778,178 A | * | 7/1998 | Arunachalam ............. 709/203 |
| 5,796,952 A | | 8/1998 | Davis et al. |
| 5,799,292 A | | 8/1998 | Hekmatpour |
| 5,870,769 A | | 2/1999 | Freund |
| 5,875,296 A | | 2/1999 | Shi et al. |
| 5,877,757 A | | 3/1999 | Baldwin et al. |
| 5,884,032 A | * | 3/1999 | Bateman et al. ............ 709/204 |
| 5,884,262 A | | 3/1999 | Wise et al. |
| 5,890,164 A | | 3/1999 | Neilsen |
| 5,915,001 A | | 6/1999 | Uppaluru |
| 5,940,614 A | | 8/1999 | Allen et al. |
| 5,945,989 A | * | 8/1999 | Freishtat et al. ......... 379/93.02 |
| 5,948,054 A | * | 9/1999 | Nielsen ...................... 709/200 |
| 5,950,173 A | | 9/1999 | Perkowski |
| 5,951,652 A | | 9/1999 | Ingrassia, Jr. et al. |
| 5,953,392 A | | 9/1999 | Rhie et al. |
| 5,953,503 A | * | 9/1999 | Mitzenmacher et al. .... 709/203 |
| 5,960,411 A | * | 9/1999 | Hartman et al. .............. 705/26 |
| 6,047,261 A | | 4/2000 | Siefert |
| 6,094,673 A | | 7/2000 | Dilip et al. |
| 6,101,472 A | | 8/2000 | Giangarra et al. |
| 6,101,473 A | | 8/2000 | Scott et al. |
| 6,130,933 A | * | 10/2000 | Miloslavsky ............... 379/90.1 |
| 6,141,413 A | | 10/2000 | Waldner et al. |
| 6,151,357 A | | 11/2000 | Jawahar et al. |
| 6,157,705 A | | 12/2000 | Perrone |
| 6,178,185 B1 | | 1/2001 | Marks |
| 6,185,288 B1 | | 2/2001 | Wong |
| 6,208,728 B1 | | 3/2001 | Airaksinen |
| 6,219,551 B1 | | 4/2001 | Hentila et al. |
| 6,226,289 B1 | | 5/2001 | Williams et al. |
| 6,256,309 B1 | | 7/2001 | Daley et al. |
| 6,259,774 B1 | | 7/2001 | Miloslavsky |
| 6,272,129 B1 | | 8/2001 | Dynarski et al. |

* cited by examiner

METHOD AND APPARATUS FOR ESTABLISHING CONNECTIONS

FIELD OF THE INVENTION

The present invention relates to a system for establishing connections between two individuals. Additionally, the present invention provides a system for displaying information about a telephone caller to a telephone agent.

BACKGROUND

Various systems have been developed that allow two individuals to communicate with one another. With the growth of the Internet and other networks and information distribution systems, individuals are accessing and retrieving data and other information in new ways. For example, an individual desiring information about a particular company, organization, or product, may search the Internet or other information sources to obtain the desired information. In certain instances, the information located by the individual may not contain all of the information desired by the individual. When this occurs, the individual must continue searching other information sources, or contact the company or organization providing the information on the Internet. Thus, an individual might obtain a portion of the desired information from a manufacturer's web site, but still require additional information about the product which is not provided at the web site. In this case, the individual may contact the manufacturer by placing a telephone call to the manufacturer to talk with a representative in an attempt to obtain the additional information. To place this telephone call, the individual must first locate the telephone number of the manufacturer and manually place a call to the manufacturer, and perhaps navigate the manufacturer's telephone answering system to locate a representative capable of providing the additional desired information. This approach can be tedious in that the proper phone number to contact the manufacturer may not be readily available, and the individual may be uncertain as to the proper person or the proper department at the manufacturer that can provide the desired information.

In situations where an individual calls an organization to talk to an agent of the organization, the organization may obtain the telephone number of the caller or other information for properly handling the call (e.g., selecting an appropriate agent to answer the call). Various information about the caller (e.g., prior purchases and account balance) may be displayed to the agent before the call is answered. In existing systems, a custom software application is executed on the agent's computer to retrieve and display information about the caller. This custom software application must be installed on each agent's computer. Additionally, if the information to be displayed about a caller changes, corresponding changes may be necessary, in the custom computer application installed on each agent's computer. Changes in the layout of information on the display may also require changes or upgrades to the custom computer applications.

It is therefore desirable to provide a system that easily connects an individual (such as an individual viewing a web page) to a representative of the organization (such as the organization associated with the web page). Furthermore, it is desirable to provide a system that uses a non-custom software application to retrieve and display information.

SUMMARY OF THE INVENTION

Embodiments of the present invention provide a system for establishing communications between two individuals.

An embodiment of the invention receives a request for agent contact from a user. The request includes an identifier associated with a web page being viewed by the user. An agent is selected to contact the user based on the content of the web page being viewed by the user. The identifier associated with the web page is then transmitted to the selected agent. The system then establishes a connection between the user and the agent.

Other embodiments of the invention display the identified web page to the agent.

In another embodiment of the invention, the identifier associated with the web page identifies the web page being viewed by the user at the time of entering the request for agent contact.

An embodiment of the invention selects an agent to contact the user based on the content of the web page being viewed by the user at the time the request for agent contact is entered.

Other embodiments of the invention handle an incoming call by generating a web page that contains information about the caller. Information about the caller is based on the telephone number of the incoming call. An identifier associated with the generated web page is transmitted to an agent that will answer the call.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention are related to a system for establishing communications between two individuals and for providing information about a telephone caller to a telephone agent. One embodiment of the invention provides a mechanism for an individual who is viewing a particular web page to automatically request that the individual be called back by a representative of the organization associated with the web page being viewed. Thus, rather than attempting to locate the organization's telephone number and navigate a telephone answering system, embodiments of the present invention allow an individual viewing a web page to request that an agent call the individual.

In another embodiment of the invention, the telephone number (or other caller-specific data) of a telephone caller is determined by the system and used to identify information about the telephone caller. The telephone number and the identified information is used to generate a web page that displays the identified information to a telephone agent. An identifier is associated with the web page generated for viewing by the telephone agent. The web page identifier is then provided to the agent who will handle the call, such that the agent's computer automatically displays the generated web page. Thus, the agent's computer can view information about a caller by using a web browser application alone. Although particular embodiments of the invention are described as being coupled to the Internet, it will be appreciated that alternate embodiments of the invention may be used in any type of network environment.

Figure 1:
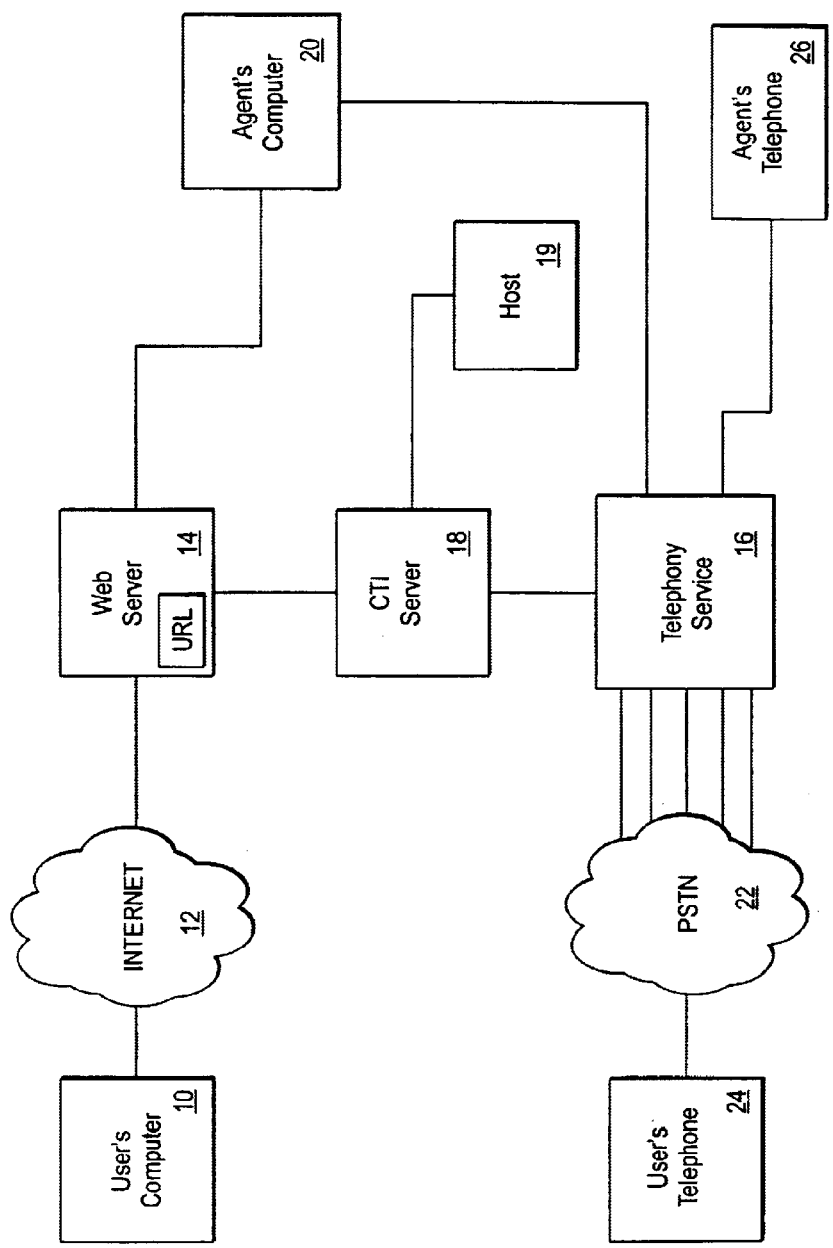
FIG. 1 illustrates an embodiment of a system capable of implementing the present invention.

FIG. 1 illustrates an embodiment of a system capable of implementing the present invention. A user's computer 10 is coupled to the Internet (identified by reference numeral 12), by a direct coupling to the Internet, through an Internet Service Provider (ISP) or through some other Internet connection mechanism. A web server 14 is also coupled to the Internet 12 and allows Internet users to browse the various web pages stored within web server 14. Any number of users are capable of accessing web server 14 through the Internet 12 at any given time. Each web page stored within web server 14 has an associated identification, commonly referred to as a uniform resource locator (URL). If a user's web browser application executing on the user's computer 10 requests a particular URL, web server 14 provides the requested web page to the web browser via the Internet 12.

Web server 14 may contain numerous web pages associated with different companies, organizations, and/or individuals. Alternatively, web server 14 may be dedicated to web pages associated with a particular company, organization, or individual. Web server 14 is coupled to a computer telephony integration (CTI) server 18, which is coupled to a telephony server 16. CTI server 18 provides an interface between web server 14 and telephony server 16. Additionally, CTI server 18 is coupled to a host 19, which may be a computer system, a database, or other device. CTI server 18 is capable of communicating with host 19 to transmit data between host 19, web server 14, and telephony server 16.

In a particular embodiment of the invention, telephony server 16 is an automatic call distributor (ACD). Alternatively, telephony server 16 may be a private branch exchange (PBX) or other system capable of processing transactions (e.g., telephone calls).

Telephony server 16 receives incoming telephone calls and places outbound telephone calls using a public switched telephone network (PSTN) 22. A user's telephone 24 is also coupled to PSTN 22 for communicating with telephony server 16. In a particular embodiment of the invention, telephony server 16 is capable of handling hundreds or thousands of incoming and/or outgoing calls across PSTN 22. Telephony server 16 is also coupled to an agent's telephone 26, which allows an agent to communicate through telephony server 16 and PSTN 22 to user's telephone 24.

An agent's computer 20 is coupled to web server 14 and telephony server 16. Computer 20 is capable of receiving data and other information, including web page information, from web server 14 or telephony server 16. Agent's computer 20 may contain multiple software applications, including a web browser application for retrieving and displaying web pages. FIG. 1 illustrates a single computer 20 and telephone 26 for purposes of explanation. However, it will be appreciated that a particular call processing system may have hundreds or thousands of agents, and corresponding computers and telephones for each agent.

Although web server 14, telephony server 16, and CTI server 18 are shown as separate devices in FIG. 1, in alternate embodiments of the invention, these servers are combined together in a single device or system. For example, telephony server 16 and CTI server 18 may be combined into a single system. Alternatively, web server 14 and CTI server 18 can be combined together in a single device. Similarly, web server 14, CTI server 18, and telephony server 16 can be combined in a single device or system. In other embodiments of the invention, host 19 is contained within CTI server 18.

Agent's computer 20 and agent's telephone 26 are illustrated in FIG. 1 as separate devices. In alternate embodiments, the two devices are merged together or use a telephone adapter to permit agent's computer 20 to perform the functions of a conventional telephone. For example, a WinSet™ adapter sold by Aspect Telecommunications of San Jose, Calif., may be used in place of telephone 26. Similarly, user's computer 10 and user's telephone 24 can be combined together in a single system. In particular embodiments of the invention, Internet 12 and PSTN 22 may be combined together in a single network environment.

Figure 2A:
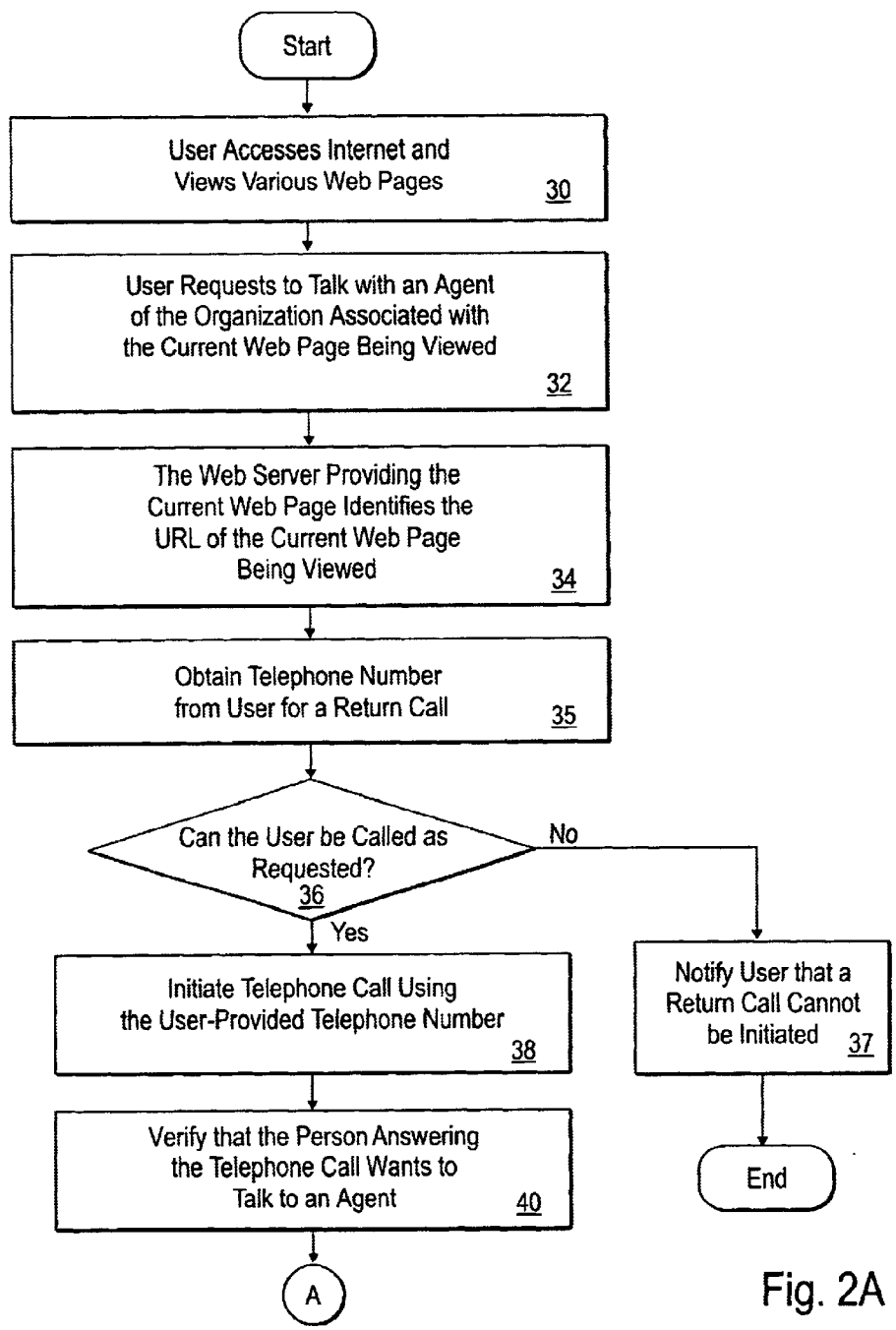
FIGS. 2A and 2B illustrate a flow diagram representing an embodiment of a procedure for establishing a telephone connection between a user accessing a web page and a telephone agent.
Figure 2B:
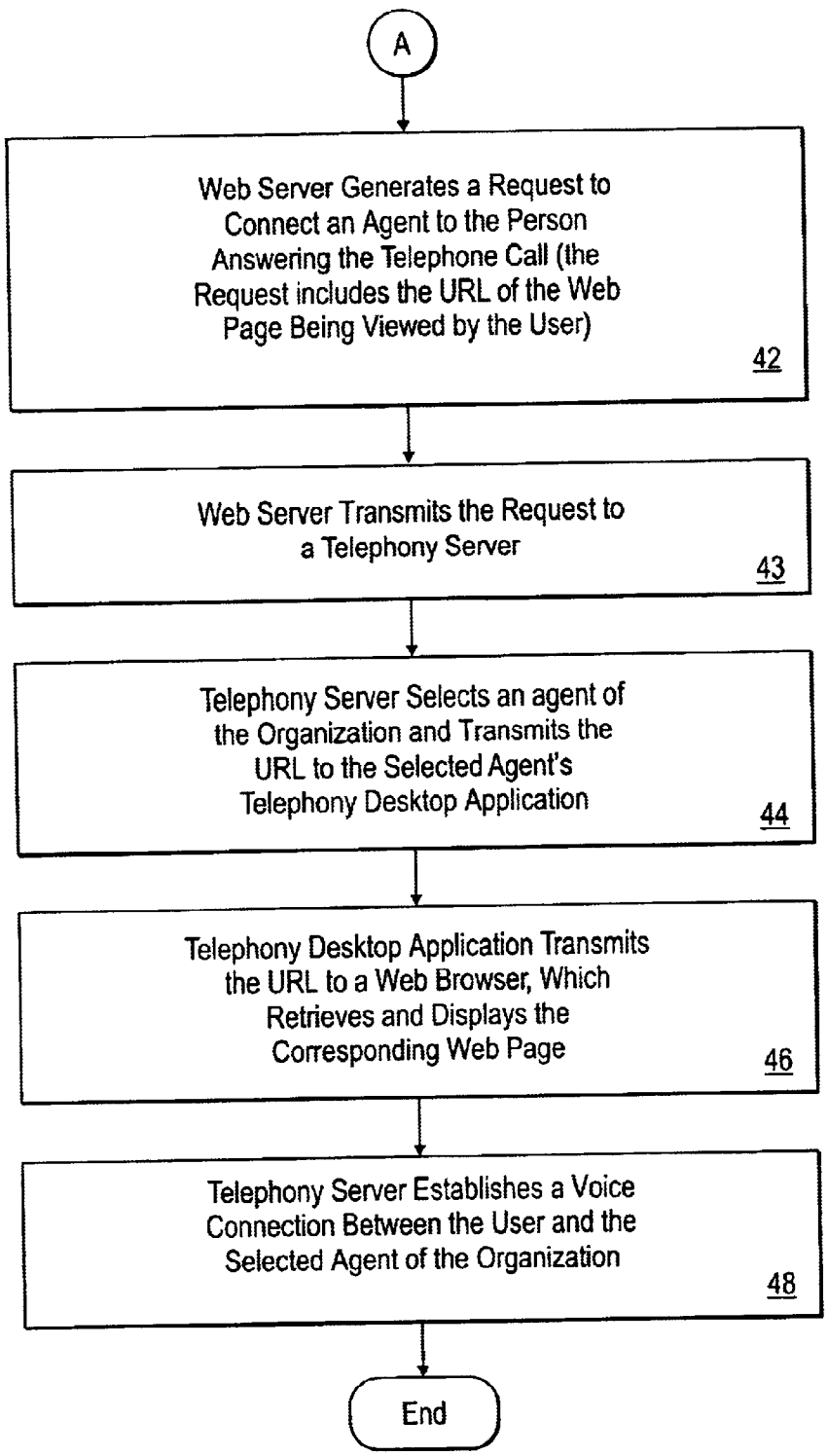

FIGS. 2A and 2B illustrate a flow diagram representing an embodiment of a procedure for establishing a telephone connection between a user accessing a web page and a telephone agent. At step 30, a user accesses the Internet and views various web pages provided by one or more web servers. After viewing one or more web pages, the user may have additional questions that are not answered by the materials in the web pages. Therefore, at step 32, the user requests to talk with an agent of the organization associated with the current web page being viewed by the user. This request may be initiated, for example, by activating a "call me back" button on the web page.

In response to the user's request to be contacted by an agent, at step 34 the web server providing the current web page identifies the URL of the current web page being viewed by the user. The URL of the current web page being viewed identifies that web page such that any web browser coupled to the Internet can access the web page using the associated URL. A URL may be a numeric identifier (e.g., "121.0.24.76") or an alphanumeric string identifier (e.g., "www.aspect.com"). In alternate embodiments of the invention, any type of web page identifier can be used to indicate the web page being viewed by the user. The purpose of the web page identifier is to allow the telephony desktop application on the agent's computer to retrieve and display the web page viewed by the user.

At step 35, the procedure obtains the telephone number at which the user wants to be called. The telephone number can be obtained by requesting that the user enter the number in a space provided on the web page. At step 36, the procedure determines whether the user can be called as requested. If not, the procedure branches to step 37 to notify the user that a return call cannot be initiated. Additionally, the user may be given information regarding how and when to contact the organization. Step 36 may determine that the user cannot be called because, for example, the organization is closed and no agents are on duty to place calls.

If step 36 determines that the user can be called as requested, then the procedure continues to step 38, where an outbound telephone call is initiated to the telephone number obtained in step 35. At step 40, the procedure verifies that the person answering the telephone call wants to talk to an agent of the organization. This ensures that the proper telephone number was obtained and dialed, and that the correct person answered the call. The verification performed in step 40 can be implemented by any type of telephone answering system or integrated voice response (IVR) system. If a verification is not received at step 40, then the procedure terminates. Otherwise, the procedure continues to step 42 in FIG. 2B.

In an embodiment of the invention, a particular time is scheduled for the user to be called by an agent. The scheduled time may be selected by the user or by the organization based on expected agent availability. A scheduled time for a return call is useful to a person who wants to be called back at a different location and requires a period of time to travel to that location. A scheduled time for a return call is useful to the organization if all agents are busy and several return calls have already been placed in queue. In this situation, the user knows when to expect a return call rather than waiting for an unknown period of time. If a return call is scheduled for a future time, the system obtains the user's telephone number and the URL in the same manner as discussed above in FIG. 2A. The telephone number and URL are stored along with the time of the scheduled return call. Thus, although the return call may be initiated when the user is no longer viewing the web page, the agent is capable of retrieving and viewing the web page before calling the user.

At step 42 (FIG. 2B), the web server generates a request to connect an agent to the person answering the telephone call. This request includes the URL of the web page being viewed by the user at the time the request to talk to an agent was generated. At step 43, the web server transmits the request to a telephony server (for example, via CTI server 18 in FIG. 1). At step 44, the telephony server selects an agent of the organization and transmits the URL of the web page viewed by the user to the selected agent's telephony desktop application. An agent may be selected at random or based on the content of the web page being viewed by the user. For example, if the user is viewing a web page associated with a particular product, then an agent familiar with that product is selected to handle the call.

At step 46, the telephony desktop application transmits the URL (provided by the telephony server) to a web browser. The web browser retrieves the web page associated with the URL from the web server and displays the web page on the agent's computer (e.g., using a web browser application). Thus, the agent is able to view the same web page viewed by the user when the request for a return was entered. At step 48, the telephony server establishes a voice connection between the requesting user and the selected agent of the organization. Once the voice connection is established, the agent is able to provide any additional information requested by the user.

In other embodiments of the invention, the telephony server also generates a web page containing information about the user. The URL of this generated web page is provided to the agent's computer along with the URL of the web page being viewed by the user. Thus, the agent's computer displays the web page being viewed by the user as well as a web page containing information about the user (e.g., account balance and geographic location of the user). Additional details regarding the generation of a web page containing user information are provided below.

Figure 3:
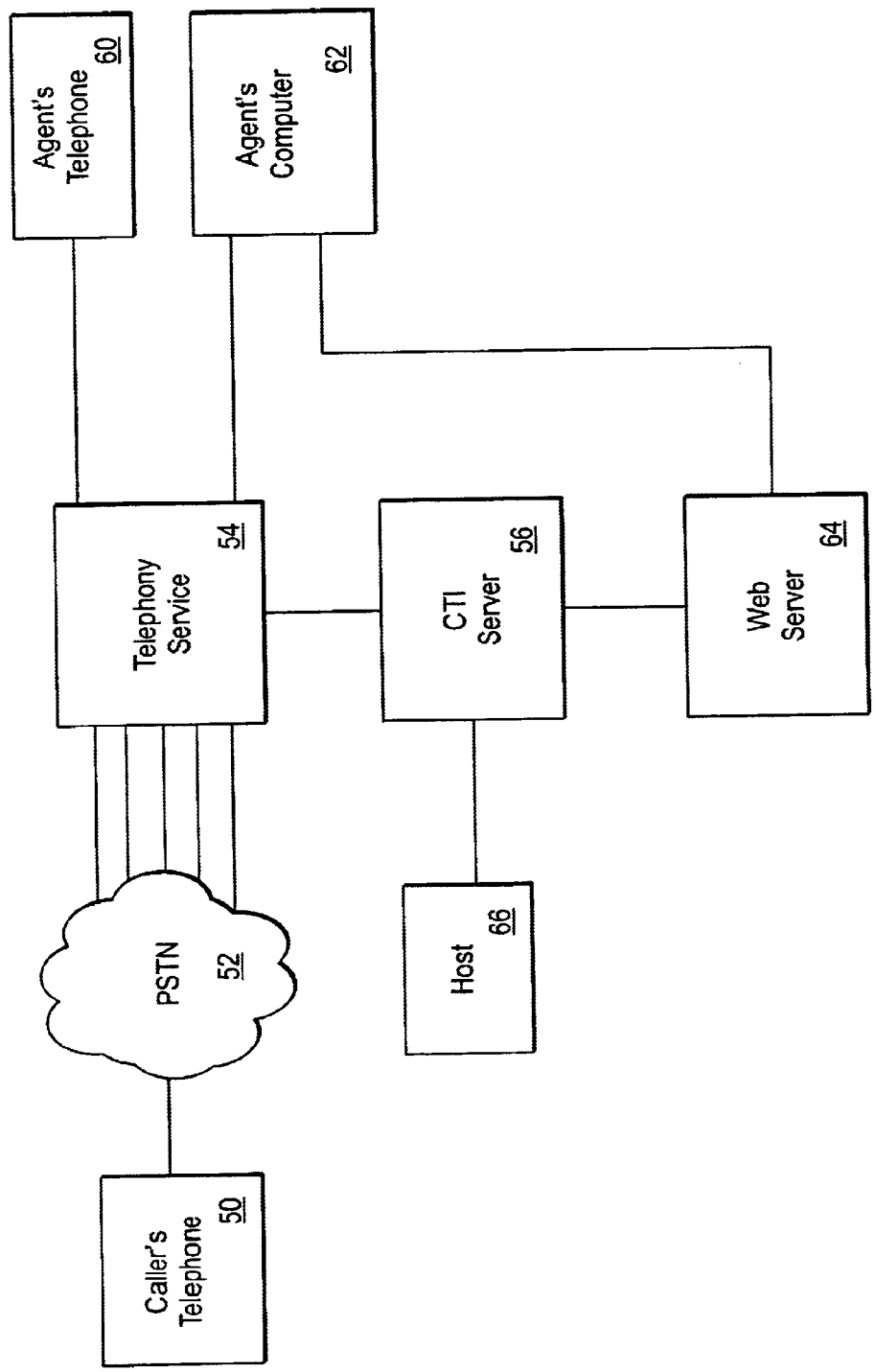
FIG. 3 illustrates another system in which embodiments of the present invention may be utilized.

FIG. 3 illustrates another system in which embodiments of the present invention may be utilized. The system illustrated in FIG. 3 allows a user to initiate a call to a telephony server, which then connects the user's call to a particular agent. Information about the calling user is obtained from a database or other storage mechanism based on the caller's telephone number. The information obtained may include account information, purchasing habits, and other information that may be useful to the agent handling the call. The information retrieved about the caller is used to generate a web page, the URL of which is provided to an agent's computer for automated display.

Referring to FIG. 3, a caller's telephone 50 is coupled to a PSTN 52. A telephony server 54 is also coupled to PSTN 52 for transmitting outgoing calls and receiving incoming calls via PSTN 52. As discussed above with respect to FIG. 1, telephony server 54 may be an ACD, a PBX, or any other system capable of handling incoming or outgoing telephone calls. A CTI server 56 is coupled to telephony server 54, a web server 64, and a host 66. CTI Server 56 provides an interface for communicating data between host 66, telephony server 54, and web server 64. Host 66 may include a database that contains information about various customers or potential callers (e.g., account information and purchasing habits).

An agent's telephone 60 is coupled to telephony server 54, thereby allowing an agent to communicate with caller's telephone 50 through PSTN 52. An agent's computer 62 is coupled to telephony server 54 and web server 64. Computer 62 is capable of receiving and displaying various information, including web pages, on a display device viewed by the agent.

Telephony server 54, CTI server 56, and web server 64 are illustrated in FIG. 3 as separate devices. However, as discussed above with respect to FIG. 1, any of the servers may be merged into a single device or system. Furthermore, host 66 can be contained within CTI server 56. Agent's telephone. 60 and agent's computer 62 are also shown in FIG. 3 as separate devices. However, as discussed above with respect to FIG. 1, the functionality of telephone 60 may be integrated into computer 62 by using an adapter or other mechanism. For example, a WinSet™ adapter sold by Aspect Telecommunications of San Jose, Calif., may be used to provide telephone functionality on agent's computer 62.

Figure 4:
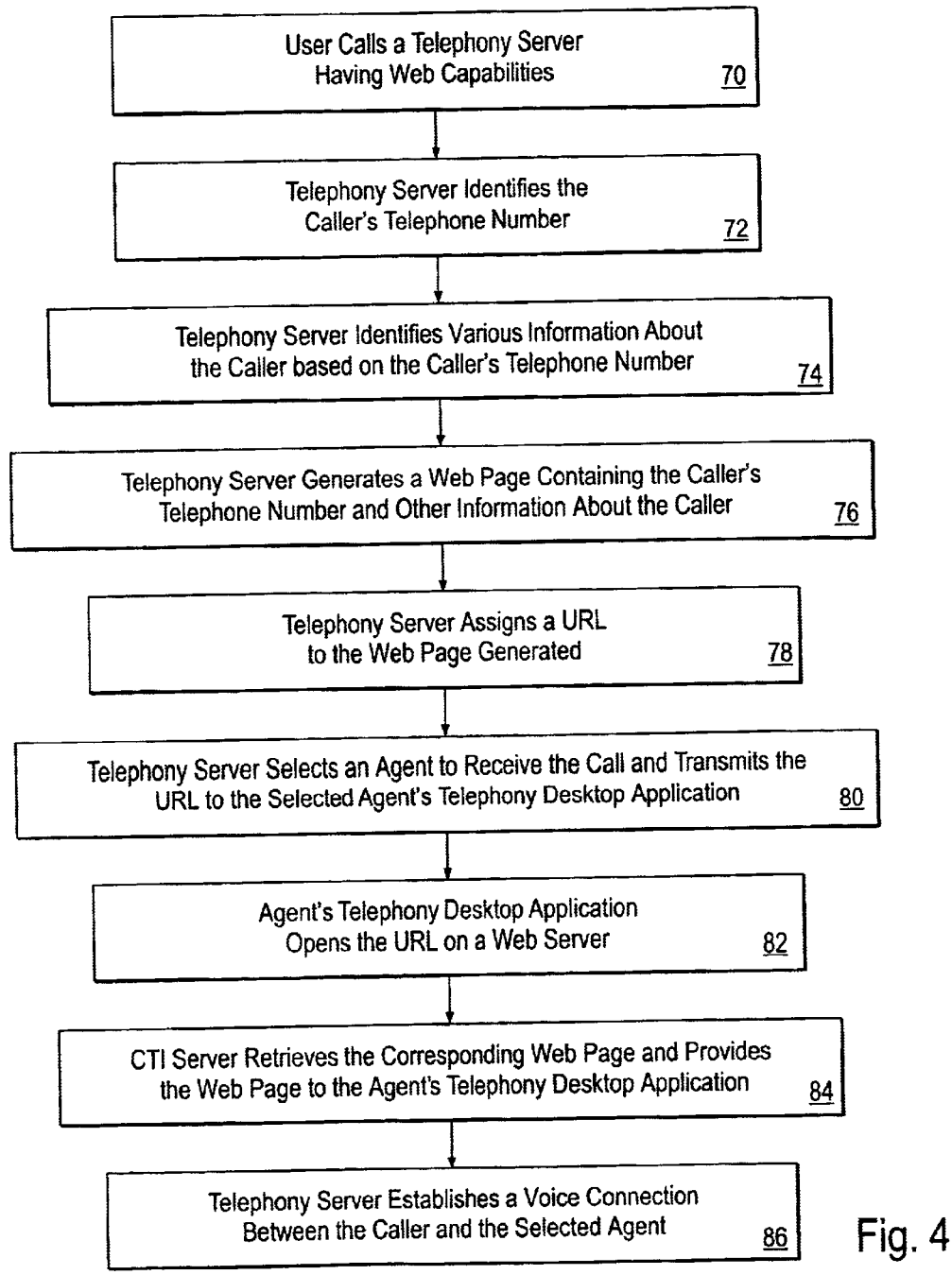
FIG. 4 is a flow diagram illustrating an embodiment of a procedure for displaying information to a telephone agent regarding a caller using a web page and a web browser application.

FIG. 4 is a flow diagram illustrating an embodiment of a procedure for displaying information to a telephone agent regarding a caller. This information is displayed to the telephone agent using a web page and a web browser application running on the agent's computer. The display of information to an agent about the caller associated with an incoming call may be referred to as a "screen pop."

At step 70, a user calls a telephony server having web capabilities (although the user is typically unaware of these web capabilities). The user dials a number associated with the organization, thereby accessing the organization's telephony server. Depending on the organization, the user may be calling to place an order, make a reservation, or obtain various types of information. At step 72, the telephony server identifies the caller's telephone number. At step 74, the telephony server identifies various information about the caller based on the caller's telephone number. This information may be stored in a database or other storage mechanism. The information about the caller may include the caller's prior purchases, current balance, and other information useful to the agent answering the call.

At step 76, the telephony server generates a web page containing the caller's telephone number and other information about the caller identified in step 74. The web page generated at step 76 may be an interactive web page that allows the agent viewing the web page to access additional information from a host or server (e.g., host 66 in FIG. 3). At step 78, the telephony server assigns a URL to the web page generated at step 76. In alternate embodiments of the invention, the telephony server assigns a unique identifier to the web page instead of a URL. As discussed above, the purpose of assigning a URL or other unique identifier to the web page is to allow the telephony desktop application on the agent's computer to retrieve and display the web page generated by the telephony server.

At step 80, the telephony server selects an agent to receive the call and transmits the URL (or other unique identifier) to the selected agent's telephony desktop application. At step 82, the agent's telephony desktop application opens the URL on a web server. The web pages displayed are controlled by a CTI server. This causes the agent's computer to display the information known about the caller prior to or at approximately the same time the call is received by the agent. Thus, the agent's computer only requires a web browser application to retrieve and view information about the caller. The web browser application may replace one or more custom software applications previously used to retrieve and display data. At step 86, the telephony server establishes a voice connection between the caller and the selected agent, thereby allowing the selected agent to answer the call.

Generating a web page to display information about a caller allows the format and the content of the data displayed to change without requiring changes or upgrades to the software applications executing on the agent's computer. The web browser application will retrieve the web page regardless of the web page layout or content. Thus, the use of a web page browser application on the agent's computer is capable of simplifying the maintenance and operation of the information retrieval and display portions of a transaction processing system.

Embodiments of the present invention may include code sequences, instructions, parameters, and other information stored on a processor-readable medium (or computer-readable medium). The code sequences, instructions, parameters, and other information are used to perform various procedures, such as the procedures described above. The processor-readable medium may be any type of magnetic, optical, or electrical storage medium including a disk, diskette, CD-ROM, tape, memory device, or similar storage medium.

The data management system described above may be implemented using any type of computer or processor-based system. A particular system may include a processor, a cache memory, and one or more input/output (I/O) buses. The system may also include a network/communication interface, system memory, video memory, a display device, a mass storage device, a keyboard, and a pointing device. The network/communication interface is used to provide communication between various components of the system. Any of a wide range of conventional networks, such as an Ethernet network, Token Ring network, the Internet, etc. may be used. Furthermore, any communication protocol may be used to communicate information through the system.

The mass storage device is used to provide permanent storage for the data and programming instructions used to implement the above-described functions. The system memory is used to provide temporary storage for the data and programming instructions when executed by a processor. The mass storage device may be provided with the programming instructions by loading the programming instructions from a distribution storage medium, or by downloading the programming distributions from a server. Collectively, these elements are intended to represent a broad category of hardware systems, including but not limited to, general purpose computer systems.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method including:

receiving a request for agent contact from a user, wherein the request includes an identifier associated with a first web page being viewed by the user, wherein content of the first web page is retrieved from a server, and is not authored by the user;

selecting an agent to respond to the request, the selection of the agent being based on the content of the first web page;

transmitting the identifier associated with the first web page to the selected agent;

retrieving information associated with the user from a database; and generating code for a second web page that contains the information associated with the user.

2. A method as claimed in claim 1, which includes displaying the first web page associated with the identifier to the selected agent.

3. A method as claimed in claim 1, which includes displaying the second web page to the agent.

4. A method as claimed in claim 1, further including establishing a connection between the user and the selected agent, wherein the establishing the connection includes initiating a voice connection across a telephone network between the user and the selected agent.

5. A method as claimed in claim 4, which includes performing a verification.

6. A method as claimed in claim 1, in which the request is received through a web server.

7. A method as claimed in claim 1, in which the identifier associated with the web page is the uniform resource locator (URL) of the first web page currently being viewed by the user.

8. A method as claimed in claim 1, in which the method is implemented in a call processing environment.

9. A system including:

a receiving mechanism to receive a request for agent contact from a user, wherein the received request includes an identifier associated with a first web page being viewed by the user, wherein content of the first web page is retrieved from a server, and is not authored by the user;

a selection mechanism to select an agent to respond to the request, the selection being based on the content of the first web page;

a communications mechanism to transmit the identifier associated with the web page to the selected agent;

a retrieval mechanism to retrieve information about the user from a database; and a web page generator to generate code for a second web page that contains the information associated with the user.

10. A system as claimed in claim 9, which includes a display mechanism to display the first web page associated with the identifier to the selected agent.

11. A system as claimed in claim 9, which includes the second web page displayed by the retrieval mechanism.

12. A system as claimed in claim 9, further including a connection device that is a voice connection device which initiates a voice connection across a telephone network between the user and the selected agent.

13. A system, as claimed in claim 12, which includes a verification mechanism to verify that the voice connection is to the user who requested agent contact.

14. A system as claimed in claim 9, in which the receiving mechanism is web server.

15. A system including:
   means for receiving a request for agent contact from a user, wherein the request includes an identifier associated with a first web page being viewed by the user, wherein content of the first web page is retrieved from a server, and is not authored by the user;
   means for selecting an agent to respond to the request for agent contact by contacting the user, the selection of the agent being based on the content of the first web page;
   means for communicating the identifier associated with the first web page to the agent selected to contact the user;
   means for retrieving information about the user from a database; and
   means for generating code for a second web page that contains the information associated with the user.

16. A computer software product including a medium readable by a machine, the medium having stored thereon a sequence of instructions which, when executed by the machine, causes the machine to:
   receive a request for agent contact from a user, wherein the request includes an identifier associated with a first web page being viewed by the user, wherein content of the first web page is retrieved from a server, and is not authored by the user;
   select an agent to respond to the request for agent contact by contacting the user, said selection being based on the content of the first web page;
   transmit the identifier associated with the first web page to the agent selected to contact the user;
   retrieve information associated with the user from a database; and
   generate code for a second web page that contains the information associated with the user.

17. A method as claimed in claim 5 wherein verification is performed by a telephone answering system.

18. A method as in claim 5 wherein verification is performed by an integrated voice response system.

19. A method as in claim 5 wherein verification determines that a voice connection is to the user who requested agent contact.

* * * * *